Feb. 25, 1969     P. L. JOHNSTONE     3,430,116
ELECTRICAL CAPACITORS
Filed Dec. 6, 1967

PAUL L. JOHNSTONE
INVENTOR.

BY

ATTORNEY

United States Patent Office 3,430,116
Patented Feb. 25, 1969

3,430,116
ELECTRICAL CAPACITORS
Paul L. Johnstone, Greenville, Wilmington, Del., assignor to Hercules Incorporated, Wilmington, Del., a corporation of Delaware
Filed Dec. 6, 1967, Ser. No. 688,603
U.S. Cl. 317—258      4 Claims
Int. Cl. H01g 3/17

ABSTRACT OF THE DISCLOSURE

Liquid impregnated electrical capacitors having high corona starting voltage and capacitance contain, as the dielectric spacer, non-porous oriented thermoplastic film, and particularly biaxially oriented polypropylene film, which has been shrunken in selected areas to give surface irregularities.

---

Figure 1:
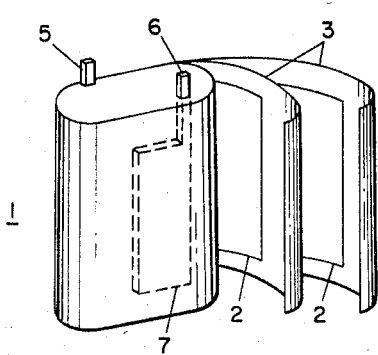

The present invention relates to electrical capacitors and, more particularly, to compact, liquid impregnated, electric capacitors having as the dielectric spacer a thermoplastic film.

Capacitor dielectric spacers have in the past been made of kraft paper or other cellulosic materials and more recently of synthetic resin films, either alone or in conjunction with kraft paper sheets. Synthetic resin films in general are superior to cellulosic sheet dielectrics in that they can withstand higher voltage stresses per unit of thickness, are less subject to flaws and defects, such as pin holes or conducting particles which reduce electrical strength, and have lower dissipation factor or power loss characteristics. In view of these and other properties, capacitors with synthetic resin film dielectrics can usually be made smaller than paper dielectric capacitors to obtain equivalent capacitance and voltage ratings. However, thin films of synthetic resins are subject to the drawback that they tend to stick and to adhere tightly to one another, and to the electrode foils with which they are wound in the manufacture of capacitors. The resultant sticking (commonly referred to as "blocking") of the synthetic resin film surfaces to adjacent surfaces of synthetic resin film or metal foil makes it difficult to impregnate such capacitors after winding. Moreover, the sticking tendencies cause the finally rolled capacitor unit to have air voids therein, and prevent ready flow of dielectric liquid to all portions of the roll. As a result, corona starting voltage is markedly lowered and the capacitor units are subject to premature breakdown and shortened operational life. Additionally, the non-porous nature of the synthetic resin films makes it difficult to impregnate them adequately. Poor impregnation results in unoccupied pores and voids in the interstices occurring between the films and adjacent non-porous surfaces with resultant deterioration and premature breakdown.

One method which has been proposed to improve impregnation of capacitors containing synthetic resin dielectrics is to use a porous material such as kraft paper in conjunction with the synthetic resin film. In these composite or layered dielectric capacitors, the porous layer, probably due to a wicking action, provides better and more uniform imrpegnation of the dielectric fluid. However, the use of a paper layer decreases the ability of the dielectric to withstand high voltage stresses per unit of thickness, and decreases dissipitation factor characteristics so that in general the beneficial results are offset to a commercially significant extent.

Another method which has been proposed to improve impregnation of synthetic resin films involves, including either on the film surface or throughout its mass, a particulate inorganic dielectric material such as aluminum oxide. However, the use of aluminum oxide, as a dusting on the film, is subject to the disadvantage that it is difficult to obtain and maintain a uniform distribution of the particles of the oxide on the film surface, and the incorporation of aluminum oxide into the resin prior to film formation is subject to the disadvantages that it is difficult to obtain uniform resinous dispersions and to extrude the resin under conditions such as to obtain a satisfactory film.

Still another method which has been proposed to improve impregnation of synthetic resin films involves roughening either one or both surfaces of the film by an embossing treatment which forms projections of the resin raised from the surface of the film. By and large this latter method provides a well roughened film dielectric. However, because the method requires contacting the film with a patterned embossing roll under pressure until the pattern is formed into the film, this technique is at best very slow and time consuming. Moreover, during the embossing treatment it is necessary to control the film thickness, depth of embossing and pressure carefully and within relatively narrow limits in order not to destroy the integrity of the film or to stress or damage the film surface.

Now, in accordance with this invention it has been found that improved liquid impregnated electrical capacitors having synthetic resin film dielectrics can be produced without the above disadvantages and that the capacitors so produced are capable of withstanding relatively high voltages without suffering dielectric breakdown or corona discharges.

Accordingly, the present invention is directed to an electrical capacitor comprising a pair of conductive electrodes separated by a dielectric spacer comprising at least one non-porous, oriented thermoplastic film having a multiplicity of shrunken portions alternating with unshrunken portions thereby forming surface irregularities on said film and a dielectric fluid impregnating the thermoplastic film.

The thermoplastic material which forms the solid dielectric film of the capacitors of this invention can be any thermoplastic film-forming homopolymer or copolymer from which oriented films can be produced. Many such polymers are known, and include for example the polyolefins such as the polymers of ethylene or the higher mono-alpha-olefins containing 3 or more carbon atoms as well as copolymers thereof with a different olefin or a vinyl ester and the like; the polyesters such as poly-(ethylene terephthalate); polystyrene and the vinyl polymers such as poly(vinyl chloride), or poly(vinyidene chloride), vinylidene chloride-vinyl chloride copolymers, vinyl chloride-acrylonitrile copolymers, and the like; the polycarbonates; the polyamides; and the like. Particulary preferred because of the favorable mechanical and dielectric properties are the high molecular weight linear polymers of ethylene and the stereoregular crystalline polymers of propylene, butene-1, pentene-1, 3-methylbutene-1 and 4-methylpentene-1.

Oriented films of these polymers can be formed for purposes of this invention by rolling, extruding, pressing, solvent casting or melt casting the polymer into film and then stretching the film longitudinally and/or transversely to impart uniaxial, biaxial or balanced biaxial orientation.

The oriented film, as previously stated, has a multiplicity of shrunken portions alternating with unshrunken portions. The surface of plastic film which has been selectively shrunken in this manner is irregular. At the boundaries between the shrunken and unshrunken portions of the film, the unshrunken portions are raised so that they extend away from the plane of the adjacent shrunken portions. Thus the film surfaces contain irregularities but the opposite surfaces of the film are parallel due to the concavo-convex nature of the irregularities. The surface irregularities increase the thermal dimensional stability and the apparent thickness of the film, but do not change its transparency or effect to any appreciable degree such valuable film properties as dielectric strength, dissipation factor, dielectric constant, modulus, tensile strength, or the like. The shrinking of selected portions of the film is carried out by heating the film to shrinkage temperature using any suitable apparatus which will provide the desired extent of heating. One suitable method involves passing the oriented film over a heated element such as a heated roll provided with small openings, a roll with heated projections, a heated screen or the like so that the portions of the film which contact the heated element (the roll between the openings, the projections or the screen) will be shrunken while the portions of the film which lie over the openings or between the projections will not be shrunken. The temperature of the heated element, of course, will vary with the particular polymer utilized for the film, the shrinkage characteristics of the film, the rate of travel of the film and time of contact, the pattern of the heating element, etc. Generally, a temperature which ranges from about the 2% linear shrinkage temperature to about 10° C. below the crystalline melting point or the softening range of the polymer will be adequate to give sufficient irregularity without destroying the integrity of the film. The 2% linear shrinkage temperature will vary from polymer to polymer but may be determined by experimentation or from the literature (see, for example, Encyclopedia of Polymer Science and Technology, Interscience, New York (1965), vol. 2, page 361). In the following table, Table I, the preferred shrinkage temperature range is given for some representative polymers.

TABLE I

| Polymer: | Shrinkage temperature range (° C.) |
| --- | --- |
| Polyethylene [1] | 70–110 |
| Cross-linked polyethylene | 80–150 |
| Polypropylene [2] | 80–150 |
| Polystyrene | 95–110 |
| Poly(ethylene terephthalate) | 75–180 |
| Poly(vinyl chloride) | [3] 70–170 |
| Poly(vinylidene chloride) | 70–160 |

[1] Density 0.92.
[2] Density 0.905.
[3] Overall range; particular range depends upon the amount of plasticizer present.

The extent to which the surface area of the film is selectively shrunken to a matter of choice, but in general will vary from about 1 to about 75% and preferably from about 1 to about 40% of the total surface area. The shrinkage treatment described above can be carried out on oriented film of any desired thickness. Particularly preferred, however, are films having a thickness of about 0.25 to about 1.5 mils.

Figure 3:
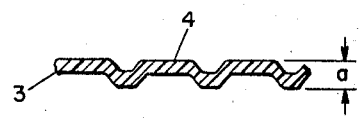
Figure 4:
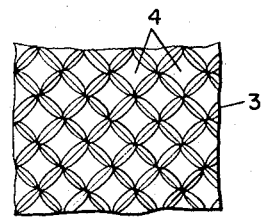

The capacitors of the present invention are constructed in the usual manner except for the solid dielectric material employed. Thus, as is shown in the accompanying drawings, FIG. 1 is a perspective view of a partially uncoiled rolled capacitor assembly, FIG. 2 is a perspective view of a capacitor of the type of FIG. 1 after being encased in a container, FIG. 3 is a fragmentary cross-sectional view of the dielectric spacer film, and FIG. 4 is an expanded top view of the surface of the dielectric spacer film.

With reference to the drawings, the capacitor assembly 1 of FIG. 1 can be made by convolutely windings strips 2 and 2′ of metal foil such as aluminum, copper, tantalum, etc., with an interleaved dielectric spacer comprising a sheet of a non-porous oriented thermoplastic film 3 having surface irregularities denoted as portions 4 (see FIGS. 3 and 4) raised from the film surface and an apparent thickness, $a$, as measured between two flat surfaces.

Electrical contact with the electrodes can be made by laid-in tap straps 5 and 6 having their ends protruding from one end of the rolled capacitor assembly. The tap straps can be welded to the electrodes, if desired, to obtain a better contact, and the lower part of the straps 5 and 6 can be enlarged as at 7 to provide a larger contact area with its cooperating electrode.

Figure 2:
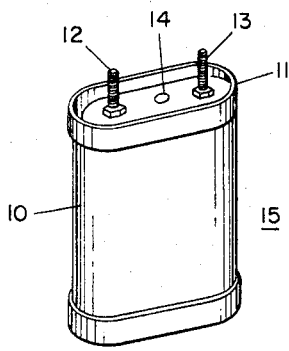

Prior to impregnation, the electrode-spacer assembly 1 is usually placed in a container such as the metal container 10 shown in FIG. 2, and the cover 11 hermetically sealed to the container.

Although not illustrated, the unit 15 shown in FIG. 2 further includes a dielectric liquid which occupies the remaining space in container 10 not occupied by the capacitor assembly and which also impregnates the dielectric spacer 3.

Before the cover is sealed on the container, the contact tap straps 5 and 6 are respectively affixed to the terminals 12 and 13 extending through and insulated from the cover. In order to allow withdrawal of moisture and air from the assembly and the introduction of the impregnating liquid, a small hole 14 is provided in the cover 11.

Before impregnation, the capacitor assemblies are normally vacuum dried to remove residual moisture. The drying temperature will vary, of course, depending on the particular polymer used as the solid dielectric and on the length of the drying cycle. With too low a temperature, the drying period is excessively long, while too high a temperature causes decomposition and shrinkage of the dielectric spacer.

The impregnating dielectric liquid is admitted to the capacitor assembly through hole 14 preferably while the dried assembly is still under vacuum in a suitable evacuated enclosure. Usually, sufficient impregnating liquid is introduced to at least submerge the capacitor element in the container. The pressure in the enclosure is then raised to atmospheric pressure, and the assembly permitted to stand for a number of hours for thorough penetration of the liquid impregnant. After impregnation, the capacitor unit is sealed, as by applying a suitable quantity of solder to hole 14. In addition to the foregoing processes, other techniques which generally utilize heat and/or pressure, can be utilized to aid in the impregnating process.

Certain well known fluid impregnating liquids can be employed in the present invention. Examples of suitable impregnants are mineral oil, castor oil, cottonseed oil, silicone oil, polybutene and any of the various halogenated aromatic hydrocarbon compounds. Examples of the halogenated aromatic compounds are the chlorinated- diphenyls, the chlorinated diphenyl ketones, pentachloronitrodiphenyl and its alkyl derivatives, chlorinated benzene and benzene derivatives and the like.

By way of example, a group of power capacitors was made, each containing a wound pair of aluminum electrode foils separated by one sheet of 0.6 mil biaxially oriented polypropylene film which had been passed at 500 ft./min. over a 60 mesh wire screen clad roll heated to about 140° C. so that in the very short time of contact of the film with the heated wire of the screen the contacted surfaces of the film were shrunk, giving surface irregularities to the film. The apparent thickness of the shrunken film was 1.0 mil, as measured between 2 flat surfaces. A control group of capacitors was made of identical construction except that the polypropylene film was 1.0 mil film which was not selectively shrunken. Both groups were impregnated with chlorinated diphenyl dielectric liquid (Aroclor 1242) under the same conditions. The average corona starting voltage of the control group of capacitors was much lower than that of the group made with the selectively shrunken polyproylene film. These tests indicate that the irregular surface of the shrunken film improves the impregnability of thermoplastic dielectric films as evidenced by the higher corona starting voltages.

A second control group of capacitors of the same size was also constructed in the manner of the example except that a paper-polypropylene film composite composed of a single sheet of the unshrunken, biaxially oriented polypropylene film 0.6 mil thick and a single sheet of kraft paper 0.4 mil thick was substituted for the selectively shrunken polypropylene film. Tests conducted thereon showed that the capacitors of the example had a higher starting voltage and capacitance than the control capacitors containing the paper-polypropylene film composite.

What I claim and desire to protect by Letters Patent is:

1. An electrical capacitor comprising a pair of conductive electrodes separated by a dielectric spacer comprising at least one non-porous oriented thermoplastic film having a multiplicity of shrunken portions alternating with unshrunken portions thereby forming surface irregularities on said film and a dielectric fluid impregnating the thermoplastic film.

2. The capacitor of claim 1 wherein the film is biaxially oriented.

3. The capacitor of claim 2 wherein the thermoplastic is a polyolefin.

4. The capacitor of claim 3 wherein the polyolefin is polypropylene.

References Cited

FOREIGN PATENTS 106,535   2/1939   Australia.

LEWIS H. MYERS, *Primary Examiner.*

ELLIOT A. GOLDBERG, *Assistant Examiner.*

U.S. Cl. X.R.

174—25; 264—230, 242; 317—260